(12) United States Patent
Simonsohn

(10) Patent No.: US 9,099,857 B2
(45) Date of Patent: Aug. 4, 2015

(54) LASER-BEAM-ABSORBING HELICAL SUPPORT AND PROCESS AND DEVICE FOR THE PRODUCTION THEREOF

(75) Inventor: Thilo Simonsohn, Munich (DE)

(73) Assignee: Tyco Electronics Raychem GmbH, Ottobrunn (DE)

( * ) Notice: Subject to any disclaimer, the term of this patent is extended or adjusted under 35 U.S.C. 154(b) by 1270 days.

(21) Appl. No.: 12/992,860

(22) PCT Filed: May 15, 2009

(86) PCT No.: PCT/EP2009/003493
§ 371 (c)(1),
(2), (4) Date: Nov. 15, 2010

(87) PCT Pub. No.: WO2009/138248
PCT Pub. Date: Nov. 19, 2009

(65) Prior Publication Data
US 2011/0067775 A1 Mar. 24, 2011

(30) Foreign Application Priority Data
May 16, 2008 (DE) .......................... 10 2008 023 963

(51) Int. Cl.
*F16L 11/00* (2006.01)
*H02G 15/18* (2006.01)
(Continued)

(52) U.S. Cl.
CPC ............ *H02G 15/1833* (2013.01); *B29C 53/78* (2013.01); *B29C 61/065* (2013.01);
(Continued)

(58) Field of Classification Search
CPC .............. F16L 9/16; F16L 11/16; F16L 11/24

USPC .......................................... 138/129, 134, 154
See application file for complete search history.

(56) References Cited

U.S. PATENT DOCUMENTS 2,288,094 A * 6/1942 Karmazin ..................... 228/145
3,974,016 A * 8/1976 Bondybey et al. .......... 156/272.8
(Continued)

FOREIGN PATENT DOCUMENTS

DE 19820634 2/2000
DE 102006012593 9/2007
(Continued)

OTHER PUBLICATIONS

Search Report and Written Opinion for PCT International Application Serial No. PCT/EP2009/003493 issued by the European Patent Office on Sep. 10, 2009.

*Primary Examiner* — James Hook
(74) *Attorney, Agent, or Firm* — Faegre Baker Daniels LLP

(57) ABSTRACT

The invention relates to a tubular helical support (1) for the radial support of resiliently expanded tubing (27), a process and a device (18) for the production thereof, and a tubing arrangement (26) comprising a helical support (1) according to the invention, the helical support (1) being made of at least one extruded element (2), which is wound to form a plurality of windings (11, 12, 13) and the connection portions (7, 8) of which are connected to one another at least in portions by a connection seam (15), preferably formed as a laser weld seam. To produce a helical support (1) which reliably withstands the compression forces of the tubing (27), can easily be removed from the expanded tubing (27), and is easy and cheap to produce, it is provided in accordance with the invention that at least the interconnected connection surfaces (9, 10) of the connection portions (7, 8) of the extruded element (2) are not transparent to laser beams.

15 Claims, 7 Drawing Sheets

(51) Int. Cl.
  *B29C 65/16* (2006.01)
  *B29C 53/78* (2006.01)
  *B29C 61/06* (2006.01)
  *B29C 65/76* (2006.01)
  *B29C 65/00* (2006.01)

(52) U.S. Cl.
  CPC ........... *B29C65/168* (2013.01); *B29C 65/1632* (2013.01); *B29C 65/1658* (2013.01); *B29C 65/1667* (2013.01); *B29C 66/1282* (2013.01); *B29C 66/12821* (2013.01); *B29C 66/12841* (2013.01); *B29C 66/12842* (2013.01); *B29C 66/21* (2013.01); *B29C 66/221* (2013.01); *B29C 66/4322* (2013.01); *B29C 66/4329* (2013.01); *B29C 66/49* (2013.01); *B29C 65/1664* (2013.01); *B29C 65/76* (2013.01); *B29C 66/0242* (2013.01); *B29C 66/81463* (2013.01); *B29C 66/83411* (2013.01)

(56) References Cited

U.S. PATENT DOCUMENTS

| | | | | |
|---|---|---|---|---|
| 4,119,123 A * | 10/1978 | Samuels | ........................ | 138/122 |
| 4,291,728 A * | 9/1981 | Cothran | ........................ | 138/122 |
| 4,531,551 A * | 7/1985 | Eichelberger et al. | ........ | 138/129 |
| 4,759,389 A * | 7/1988 | Woo Suck | ..................... | 138/154 |
| 5,087,492 A * | 2/1992 | Vallauri et al. | ................ | 428/34.9 |
| 5,341,849 A * | 8/1994 | Mang | .............................. | 138/133 |
| 5,670,223 A * | 9/1997 | Sadlo et al. | .................... | 428/34.9 |
| 5,800,886 A * | 9/1998 | Vallauri et al. | ................ | 428/35.8 |
| 6,889,715 B2 * | 5/2005 | Fraser et al. | ................... | 138/129 |
| 7,244,482 B2 * | 7/2007 | Bager et al. | ................... | 428/35.2 |
| 7,572,492 B2 * | 8/2009 | Bager et al. | ................... | 428/35.2 |
| 7,713,607 B2 * | 5/2010 | Sugawara et al. | .............. | 428/57 |
| 7,785,687 B2 * | 8/2010 | Ando | ............................... | 428/57 |
| 7,960,012 B2 * | 6/2011 | Kihara et al. | .................. | 428/174 |
| 2003/0039837 A1 * | 2/2003 | Koshida et al. | ............. | 428/411.1 |
| 2004/0112519 A1 * | 6/2004 | Mori | ........................... | 156/272.8 |
| 2004/0144483 A1 * | 7/2004 | Sugawara et al. | ........... | 156/272.8 |
| 2005/0003301 A1 * | 1/2005 | Sugawara et al. | ........... | 430/270.1 |
| 2005/0081991 A1 * | 4/2005 | Hatase et al. | ............... | 156/272.8 |
| 2008/0060713 A1 * | 3/2008 | Donnelly | ....................... | 138/129 |
| 2010/0132824 A1 * | 6/2010 | Melville et al. | ................ | 138/129 |

FOREIGN PATENT DOCUMENTS

| | | |
|---|---|---|
| DE | 10 2006 056781 A1 | 6/2008 |
| EP | 0399263 | 11/1990 |
| EP | 0619636 | 10/1994 |
| EP | 1 835 591 A | 9/2007 |
| FR | 2 289 588 A | 5/1976 |
| WO | 83/00779 | 3/1983 |
| WO | 93/22816 | 11/1993 |
| WO | 96/24977 | 8/1996 |
| WO | 99/08355 | 2/1999 |

* cited by examiner

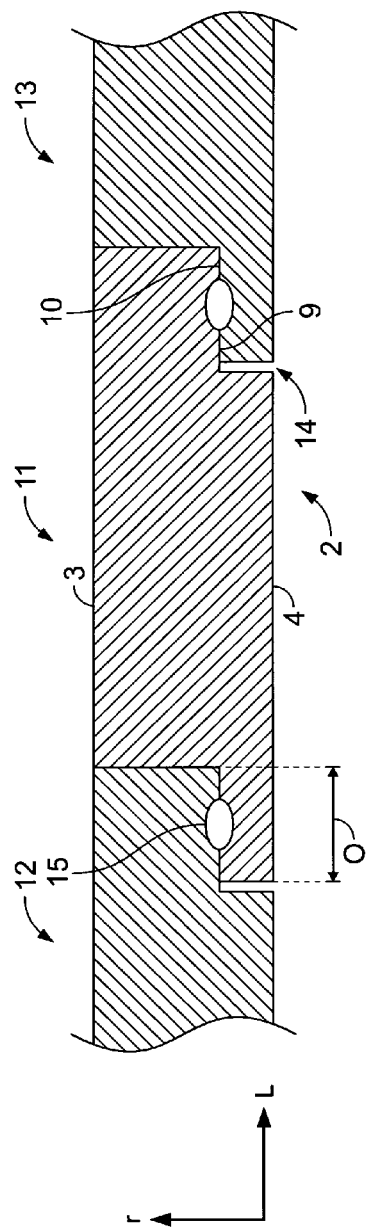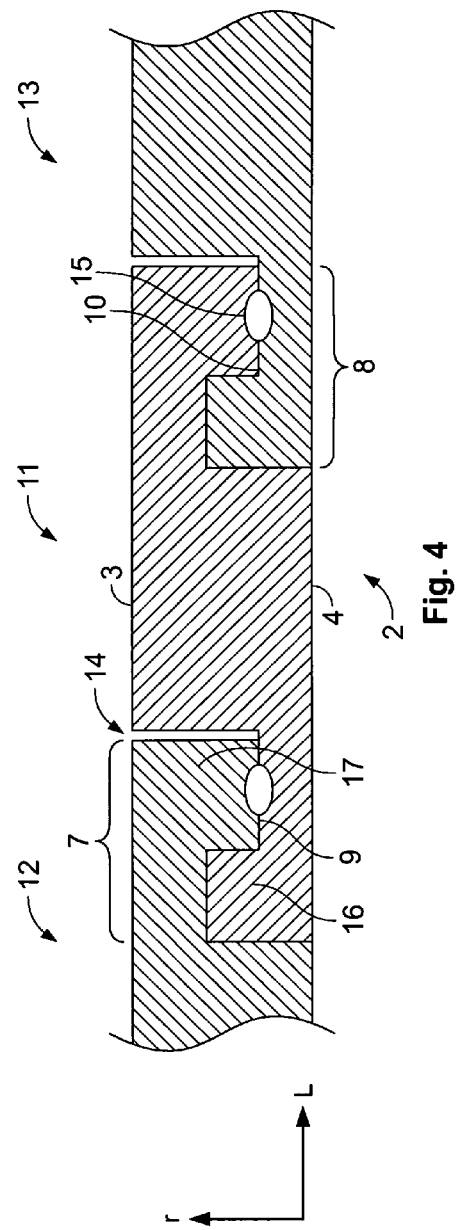

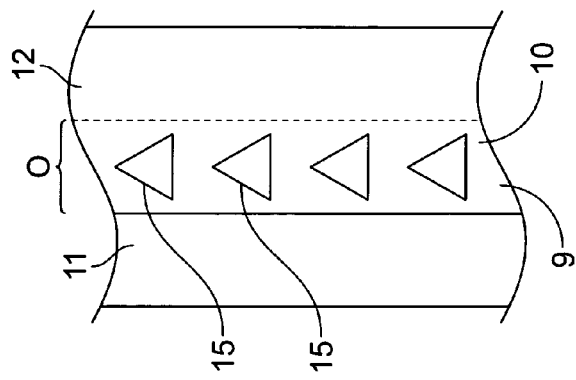
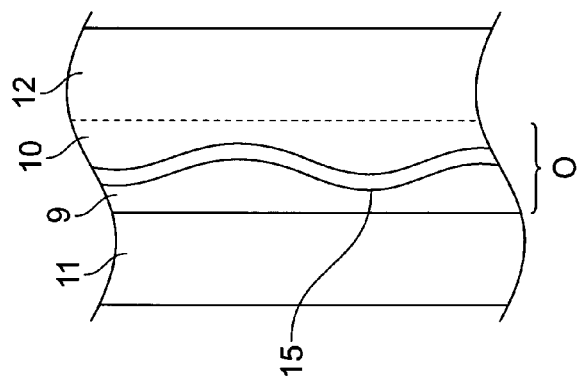
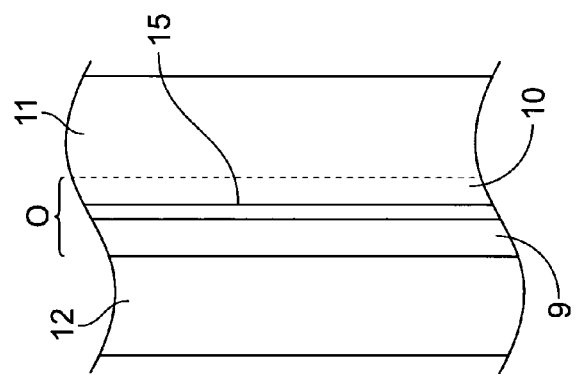
Fig. 5A  Fig. 5B  Fig. 5C
Fig. 5

LASER-BEAM-ABSORBING HELICAL SUPPORT AND PROCESS AND DEVICE FOR THE PRODUCTION THEREOF

The invention relates to a tubular helical support for the radial support of resiliently expanded tubing, made of at least one extruded element, which is wound to form a plurality of windings and provided on both sides with connection portions with complementary contours, the adjacent connection portions of two adjacent windings overlapping radially at least in portions and comprising connection surfaces connected by a connection seam.

The invention further relates to a process for the production of a tubular helical support, in which an extruded element of a winding means is fed in a feed direction and wound to form the helical support, connection surfaces, formed on both sides of the extruded element, of a wound portion and a portion not yet wound of the extruded element being made to overlap at least in part in a radial direction of the helical support and being connected to one another by means of at least one laser beam.

Furthermore, the invention relates to a device for the production of a helical support, comprising at least one winding means which supports the helical support at least in portions, at least one extruded element which can be fed to the winding means in a feed direction (L) and fastened thereto, a winding gap which widens in the direction opposite the feed direction between a portion wound on the winding means and a portion not yet wound of the extruded element, and comprising at least one laser beam source emitting at least one laser beam.

Moreover, the invention relates to a tubing arrangement comprising tubing which is resiliently expanded radially outwards and in which a helical support is arranged so as to support the tubing arrangement.

Tubular helical supports are known from the prior art and are used to hold tubing, such as insulation tubing, cable terminals, spreader caps or sleeve elements, in an expanded state before assembly. Insulation tubing is used for electrical insulation or sealing of electrical components in electrical engineering, for example cable connections or cable plug connectors. Since high electrical voltages of over 100 kV for example may be applied to these components, the insulation tubing is formed with thick walls and produced from materials with good electrical insulation properties, such as silicone. In contrast, the sleeve element may also consist, at least in part, of electrically conductive materials such as elastomers.

When assembled, the insulation tubing or sleeve element should match the outer contour of the component to be insulated and, similarly to a shrink tube, enclose it without gaps as far as possible. Therefore, the diameter of the insulation tubing or the sleeve element is resiliently expanded by about two to four times before assembly. The electrical components can thus easily be inserted into the insulation tubing or the sleeve element.

To hold the insulation tubing or the sleeve element in the expanded state until it is assembled, a support element in the form of the helical support is inserted into the insulation tubing or the sleeve element and takes up the restoring force caused by the resilient expansion of the insulation tubing. For assembly, the component to be insulated is positioned in the internally hollow helical support. The helical support is then removed from the insulation tubing in such a way that the insulation tubing can contract around the component in a sealing or insulating manner. The process for the sleeve element is the same.

Helical supports of the aforementioned type have been found to be useful for enabling the support element, which is firmly clasped by the insulation tubing or the sleeve element and may be acted on by pressures of about 10 bar for example, to be removed manually from the insulation tubing for example. The helical support can be gradually released by unwinding the extruded element, by pulling out a free end of the extruded element through the hollow helical support. As the helical support is gradually released in this way, the insulation tubing contracts automatically around the component to be insulated. In this way, the helical support can be manually removed from the insulation tubing, without further auxiliary means or devices.

Helical supports of this type must therefore, on the one hand, permanently withstand the pressure coming from the expanded insulation tubing for example, and on the other hand, be manually removable from the insulation tubing by unwinding the extruded element. Furthermore, it is important for the helical support to have a small wall thickness so as to provide sufficient space in the interior thereof for the insertion of the electrical components.

To provide these properties, in known supporting coils, the edges, directed in and against the longitudinal direction of the helical supports, of the wound extruded element are welded together, for example by heating in a furnace or by ultrasonic welding. Alternatively or additionally, the edges to be connected may be formed as connection portions in such a way as to overlap radially or even interlock mechanically.

Known helical supports are disclosed, for example, in U.S. Pat. No. 5,087,492, EP 0 619 636 A1, WO 93/22816, WO 83/00779, DE 198 20 634 C1, EP 0 399 263 A2, U.S. Pat. No. 5,670,223, WO 96/24977, WO 99/08355 or DE 10 2006 012 593 A1.

A drawback of the known helical supports is that the connection portions are rigidly connected to one another in an uneven manner by this welding process, and this means that the release forces required to manually unwind the extruded element are highly variable and it can become difficult or impossible to separate the connected connection portions of the extruded element by hand when the helical support is released, or the extruded element breaks.

If the connection portions are connected to one another too weakly, for example as a result of variations in the welding process, the helical supports may not withstand the radial pressure produced by the expanded insulation tubing.

To reduce the variations in the connection strengths between the connection portions of the wound extruded element, the aforementioned document WO 99/08355 discloses a helical support made of a wound extruded element of which the connection portions, facing in and against a longitudinal direction of the helical support, of the extruded element are specifically adapted for an ultrasound welding process by means of their particular shape.

However, the production of the extruded element with the specifically adapted connection portions is relatively complex. The winding process of the extruded element to form the helical support is more difficult to carry out than in the previous prior art since, in this case, the guide portions of adjacent windings, which portions engage in one another or behind one another in the longitudinal direction of the helical support and are connected to the connection portions, are highly rounded and thus engage less precisely in one another. The extruded element must therefore be guided more precisely during the winding process. Since, in the case of an extruded element thus formed, there may still be variations in the connection strength, caused by the ultrasound welding process, the extruded element shown here comprises a co-extruded part for improving the stability of the helical support inside the extruded element, and this makes production of the extruded element more complicated than production of homogeneous extruded elements which are produced only from one material.

To obtain a precisely positioned helical support with a connection having a defined connection strength between the adjacent windings of the helical support, DE 10 2006 012 593 A1 teaches that the connection portions of the wound extruded element are connected via a laser weld seam, two different laser welding processes being disclosed in this case.

In the first process, a laser beam is directed from a substantially radial direction into a winding gap between two adjacent windings. If the laser beam is aligned with the winding gap, then a hot region is produced on the portion of one of the windings arranged at the base of the winding gap and may also comprise a small portion of the adjacent winding. The heated regions melt and form a material connection when they solidify. If the laser beam is tilted slightly relative to the alignment of the winding gap, regions lying on the surface of the helical support facing the laser beam are heated and welded.

This process has the drawback that the shape of the laser weld seam can only be varied to a limited degree and that welds which may lie on the surface of the helical support prevent a flat configuration of the surface, which can make it difficult to introduce the helical support into the insulation tubing or to introduce the components to be insulated into the helical support. The uneven surface may also mean that the insulation tubing is permanently deformed or otherwise damaged by the unevenness during or after assembly on a helical support of this type. Neither the width nor the direction of the laser weld seam formed at the base of the winding gap can be varied.

Furthermore, in the case of a device carrying out the process it is difficult to align the laser beam, produced for example by a laser beam source, in such a way that it is aligned with the winding gap and incident on the base thereof. If the direction of the laser beam or the shape of the winding gap deviates from the specifications, the laser weld seam is not produced in the desired position and this has a negative effect on the properties of the helical support.

The second process disclosed in DE 10 2006 012 593 A1 uses an extruded element which is made, at least in part, of a material which is transparent to the laser beam. In particular, one of the connection portions is transparent. The laser beam is radially aligned through the transparent material onto overlapping connection portions which are to be welded. The laser beam thus passes through the welding surfaces of the transparent part of one of the connection portions, substantially without interacting therewith, and heats only the non-transparent welding surface of the adjacent winding. The non-transparent part also conducts this heat to the transparent part, and thus the two welding surfaces are heated to a similar degree and are welded in the irradiated area.

However, this process has the drawback that the extruded element must be co-extruded from different materials and this makes the production of the extruded element unnecessarily complicated and expensive.

To overcome this problem, DE 10 2006 012 593 A1 indicates that the extruded element may also be made entirely of a material which is transparent to the laser beam. One of the overlapping welding surfaces is, in this case, now coated with a material which absorbs the laser beam and converts it to heat.

The application of the coating is a further process step which makes the production process of the helical support unnecessarily complicated and expensive. Furthermore, it must be ensured when constructing a production device for performing this process that at least the transparent regions of the extruded element are free of impurities, at least until the welding process. For example, layers of dust lying on the extruded element may absorb some of the energy of the laser beam in such a way that the desired amount of energy does not reach the welding surfaces. To remove the dust, laminar currents of filtered air may for example be guided over the extruded element and pick the dust up and transport it away. However, other impurities such as oil films cannot be removed in this manner.

The object of the present invention is therefore to provide an improved helical support which reliably withstands pressures acting on it radially from outside, can easily be manually removed from the insulation tubing or sleeve elements, and is easy and cheap to produce.

For the helical support mentioned at the outset, the object is achieved in that the connection surfaces of the connection portions are not transparent to laser beams.

For the process mentioned at the outset, the object is achieved in that the laser beam is directed into a winding gap which widens in the direction opposite the feed direction and is formed between the wound portions and the portions not yet wound of the extruded element and onto at least one of the connection surfaces lying alongside one another.

For the device mentioned at the outset, the object is achieved in that the at least one laser beam is directed into the winding gap onto radially overlapping connection surfaces of the extruded element.

For the tubing arrangement mentioned at the outset, the object is solved in that a helical support according to the invention is arranged in the tubing arrangement in such a way as to support it.

The solution according to the invention has a particularly simple construction and has the advantage that the connection seam, which may also be formed as a laser weld seam, can in contrast to the known welding seams be produced with precisely formed and spatially well-defined dimensions, in an advantageous manner, between the radially overlapping connection surfaces, the connection surfaces at least being non-transparent to laser beams.

In contrast to DE 1 012 593 A1, when a material of this type is irradiated with laser beams, the energy thereof is substantially converted into heat in the region of the irradiated surfaces of the extruded element, all the irradiated portions thus being heated directly by the laser beam, at least to a connection temperature. The connection temperature may be less than or equal to a melting temperature of the helical support material. If the connection temperature is in particular less than the melting temperature, a further process step, in which the connection portions are pressed together during or after heating, may be necessary for the production of a sufficiently strong connection between the connection portions.

In the process, the laser beam does not pass through the extruded element without interacting therewith. This results in a particularly even connection between the windings of the helical support according to the invention, which withstands the pressure of an expanded insulation tubing and can easily be released from the insulation tubing by manually pulling on the extruded element.

The solution according to the invention may be improved by various embodiments, which may be combined in any desired manner and each of which is advantageous per se. These embodiments and the advantages associated therewith will be discussed in the following.

In this way, the connection surfaces may be provided with a coating which is non-transparent to laser beams, at least within a specific wavelength range, or absorbs laser beams.

The coating may be provided on or between the connection surfaces, for example as an inserted absorption strip, or even be absorbed by the connection elements or adsorbed onto the connection surfaces. The connection elements may also be coated so as to absorb laser beams.

The extruded element may be produced in only one manufacturing step, for example in an extrusion process, whereby a prismatic extruded element and also a helical support of any desired length may be manufactured.

If the extruded element is made entirely of one material, the production and processing thereof are simple and cheap.

The extruded element may comprise a base surface with long sides which extend parallel to the longitudinal direction of the helical support and face in and against the radial direction, the diagonally opposite corner regions of the extruded element being provided with substantially rectangular recesses which in each case encompass the corner regions. This results in complementary, substantially stepped connection portions, which face in and against the longitudinal direction and may radially overlap, at least in part, in the wound state of the extruded element.

The surfaces of the connection portions facing in the direction of the recess may be formed at least in part, as connection or welding surfaces, which radially overlap when the extruded element is wound and may be connected via a laser weld seam. The connection surfaces may extend evenly and parallel to the longitudinal direction, for example curved in a convex or concave manner or even tilted relative to the longitudinal direction, it being possible for the connection surfaces to comprise components facing in the longitudinal direction.

The connection portions formed on both sides of the extruded element, or at least the connection surfaces thereof, may consist of a material which is not transparent to laser beams at least within a specific wavelength range. If the extruded element is made entirely of this material, this results in an extruded element which is produced at low cost and in a simple manner.

The connection portions may, in addition to the connection portions, also comprise guide portions which, when wound, engage behind one another in the longitudinal direction of the helical support and can thus define the position of adjacent coils relative to one another. The guide portions may for example face substantially parallel to the radial direction of the helical support. If the end of the guide portions facing in or against the radial direction is rounded off, chamfered or pointed, any unevenness in the feed or winding of the extruded element does not lead to imprecisely positioned windings. The guide portions may be straight or curved and for example form a hook-shaped configuration together with the remaining connection portions in such a way that adjacent guide portions can engage behind one another in the longitudinal direction of the helical support when the extruded element is wound to form the helical support.

The connection surfaces may be configured as moulded elements, such as projecting surfaces of the connection portions, which can serve as defined contact surfaces even if the extruded element has measurement tolerances caused by the manufacturing process thereof.

The connection portions may be configured to be of different sizes in the longitudinal direction, resulting in a winding gap which is open on one side remaining between adjacent windings which prevents mechanical overdetermination of the windings. The open end of the winding gap may therefore face into the helical support as well as away from it and extend parallel to the radial direction of the helical support.

The connection or laser weld seam may for example be formed as a substantially straight or even wavy continuous line, the width of which can be varied to match the connection strength. To be able to vary the connection strength to an even greater degree, the connection or laser weld seam may also be repeatedly broken up. The individual connected or welded regions, which are separated from one another by non-connected or non-welded portions, may in turn be formed so as to be linear or even round, oval or polygonal, allowing the connection strength and the removal characteristics of the extruded element to be altered in a targeted manner. In this case, it may benefit the removal characteristics if the connected portions are aligned identically or so as to vary in a regularly repeating pattern. In particular, the vertices of polygonal portions may face in or against the longitudinal direction of the helical support or in a direction extending at a right angle to the longitudinal direction.

The connection of the connection surfaces may be supported by correspondingly configured connection portions by positive or non-positive connections or, for example, also by adhesives.

The connection seam connecting the connection surfaces may comprise an absorption band to which the connection surfaces are connected. The absorption band may consist of a material which is not transparent to the laser beam and converts the laser beam into heat. Furthermore, the absorption band may be formed as a thermal bridge so the converted heat can be conducted to the connection surfaces.

If the absorption band is arranged between the connection surfaces, the connection surfaces may also consist of a material which does not convert the laser beam into heat. In this case, the connection surfaces, the connection portions or the extruded element may thus consist of a material which reflects the laser beam or allows it to pass through. If the extruded element or the connection portions consist of a material of this type, then the connection surfaces may also be coated with a material which effectively converts the laser beam into heat. An absorption band is then not required.

The extruded element can be guided loosely from one end of the helical support through the helical support as far as the other end of the helical support and project from the helical support from this other end to a sufficient degree that it can easily be gripped by hand or by a tool.

A device for producing the helical support comprises at least one feed unit, with which the extruded element can be fed to a winding means in a feed direction, and at least one winding means, it being possible to fasten the extruded element to a connection point on the winding means, which is for example configured as a clamping mechanism. The connection point and the feed unit can be moved relative to one another to wind the extruded element so as to form the helical support. In this process, in a particularly simple embodiment the connection point, which may be provided on a periphery of a winding mandrel, is rotated about a longitudinal axis of the helical support. The helical support wound in this way may at least partially encompass the periphery of the winding mandrel, at least in part. This has the advantage that the winding mandrel supports the helical support during the production process.

If the first winding of the helical support is wound, a winding gap, which widens in the direction opposite the feed direction, which in turn may extend tangentially to the helical support at least in portions, is produced between the winding and a portion of the fed extruded element which has not yet been wound. The introduced extruded element may be positioned relative to the adjacent winding in such a way that the adjacent connection portions of the winding and of the fed extruded element overlap radially, at least in part. If the winding process is continued, the connection portions approach one another and the guide portions optionally provided on the connection portions engage in one another. The feed direction may be aligned tangential to the helical support, in particular in this engaged position.

A laser beam, emitted by at least one laser beam source of the production device, is directed into the winding gap and onto the connection surfaces, the laser beam heating the connection surfaces to a predetermined temperature before they are brought into contact. This temperature or connection temperature may be high enough for the connection surfaces to melt, to be brought into contact before they solidify, and when they solidify, to form a material connection in the form of a welding seam, via which the connection surfaces may be connected to one another.

Alternatively, the connection temperature may also be lower than the melting temperature of the connection surfaces. If the connection surfaces heated in this manner are pressed onto one another during the cooling process after laser irradiation, a connection seam of this type, via which the connection surfaces can be connected to one another in a sufficiently strong manner, can still be produced between the connection surfaces in this manner.

The connection seam produced in this manner lies inside the helical support at a distance from the periphery thereof and does not deform the regions arranging on the outside or inside of the helical support.

Optical elements, which shape a laser beam and in particular focus it, may also be introduced into the path of the laser beam.

It is also possible for a plurality of laser beams, in particular two, containing the laser beam energy to be directed onto the connection surfaces, each laser beam heating a connection surface up to the connection temperature. If the power of a single laser beam source is sufficient for this purpose, the laser beam emitted thereby may also be divided up into two or more laser beams by at least one beam splitter arranged in the path of the laser beam. This allows the connection surfaces to be heated at a greater distance from one another than when a single, undivided laser beam is used.

The connection surfaces may be preheated to a predetermined preheating temperature, which may be lower than the connection temperature, by two laser beams, at a distance from a contact point at which an already wound part can meet a part of the extruded element fed to the helical support and the two parts can be contacted with one another. The regions of the connection surfaces preheated in this manner may be heated up to the connection temperature by a third laser beam shortly before the contact point. By using three laser beams, which can also be produced from only one laser beam source using appropriate optics, it may be possible for the heating and connection processes to be better controlled.

If space requirements, for example, do not permit the laser acting as a laser beam source to be arranged in the vicinity of the winding gap, then the laser beam may also be deflected by deflection elements, such as mirrors or prisms, and directed into the winding gap. To configure the connection seam in a wavelike manner, for example, the position of at least one of the deflection elements may be altered in a targeted manner in such a way that a wavelike connection seam, or even polygonally shaped connection regions which may be separated from one another, are produced, for example. The position of the beam splitter may also be varied by means of appropriate control elements in order to form the connection seam in a targeted manner. In particular when producing non-continuous connection seams, laser beam interrupters may also be positioned in the beam path and do not allow the laser beam to pass in the direction of the winding gap at predetermined points in time.

A shaping unit, which shapes the extruded element and is in particular configured as an extrusion means, and additionally or alternatively a reserve means for extruded elements, may be part of the production device disclosed herein for the helical support.

The winding mandrel may be configured to have a diameter which varies in the longitudinal direction of the helical support to be wound, so the finished helical support may also have a varying diameter along the longitudinal direction thereof.

Instead of pressure rollers, which press radially from the outside on the extruded element which is fed and wound to form the helical support, at least one runner may be used and forms a gap, which narrows in the feed direction, with the portion of the extrusion element already wound and exerts a radially inwardly directed pressure on the most recently wound extruded element. The pressure may also be created by a force which acts, in the direction opposite the feed direction, on the extruded elements to be wound and winds said extruded elements.

The connection seam may comprise an absorption band which is fed to the winding gap when the extruded element is wound to form the helical support and is applied to at least one of the connection surfaces. In this case, the absorption band may also be adhered or positively or non-positively connected to the connection surface. The absorption band may be of a width less than or equal to the width of the overlap region, extending in the longitudinal direction of the helical support, of the connection surfaces and may be formed as a continuous strand, i.e. with a length at least allowing the production of a helical support of a predetermined length.

At least at the contact point, the absorption band may lie between the connection surfaces and be connected or welded to the connection surfaces as a component of the connection seam. For this purpose, the laser beam may be directed into the winding gap and at least onto the absorption band and heat at least said absorption band. Alternatively, the laser may be directed onto at least one of the connection surfaces and the absorption band.

The absorption band may consist of a material which converts the laser beam into heat, so the laser beam directed onto the absorption band may heat the absorption band, at least to the connection temperature. If the absorption band is additionally configured as a thermal bridge, the converted heat may further be conducted through the absorption band to the connection surfaces, in particular evenly where possible, and be released into said surfaces.

If an absorption band is used in connecting the connection surfaces to produce the helical support, then the connection surfaces or the connection portions, both or each individually, or even the entire extruded element, may consist of a material which is transparent to the laser beam or reflects the laser beam and does not convert the laser beam into heat. If the connection portions of the connection surfaces consist of materials which are not easily connected or welded together, the absorption band may be configured as a component facilitating the connection.

In the following, the invention will be explained by way of embodiments with reference to the drawings. The various features of these embodiments may be combined independently of one another, as is shown in the individual advantageous configurations. In the drawings:

FIG. 3 is a schematic view of a section in the longitudinal direction of the helical support;

FIG. 4 is a schematic sectional view of a further embodiment of the helical support;

Figure 1:
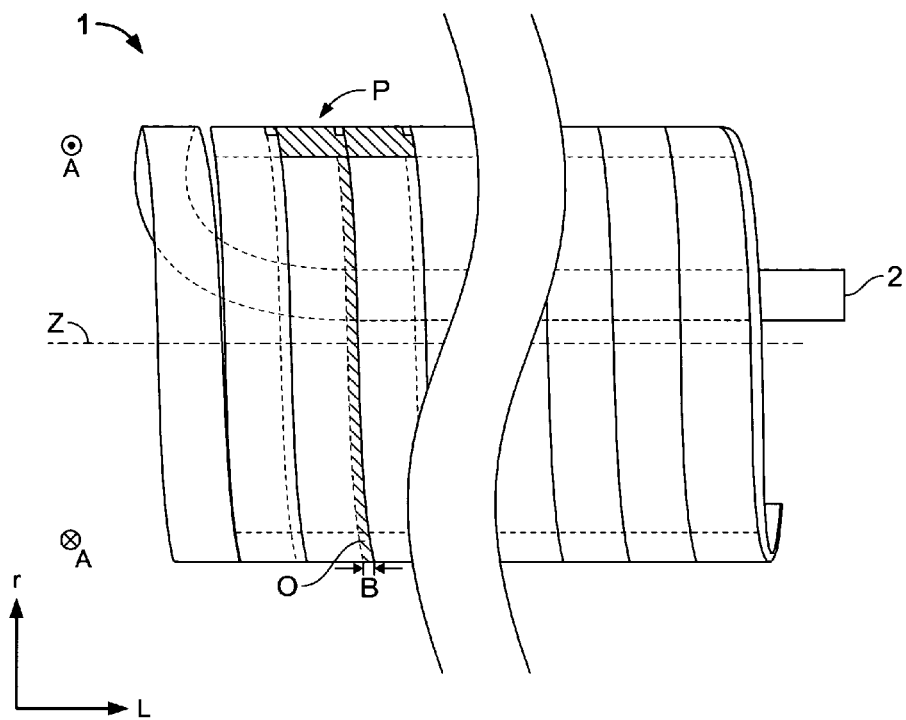
FIG. 1 is a schematic view of a helical support according to the invention.
Figure 6:
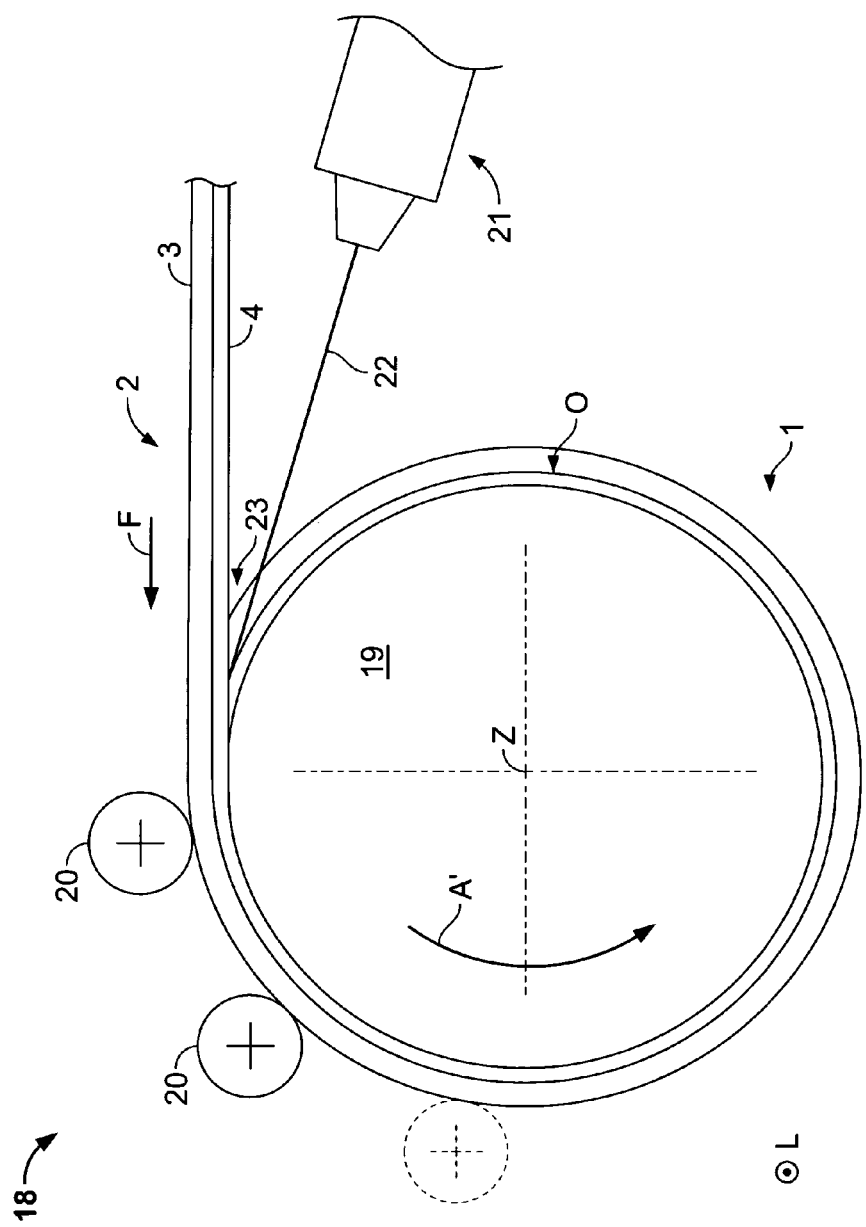
Figure 7:
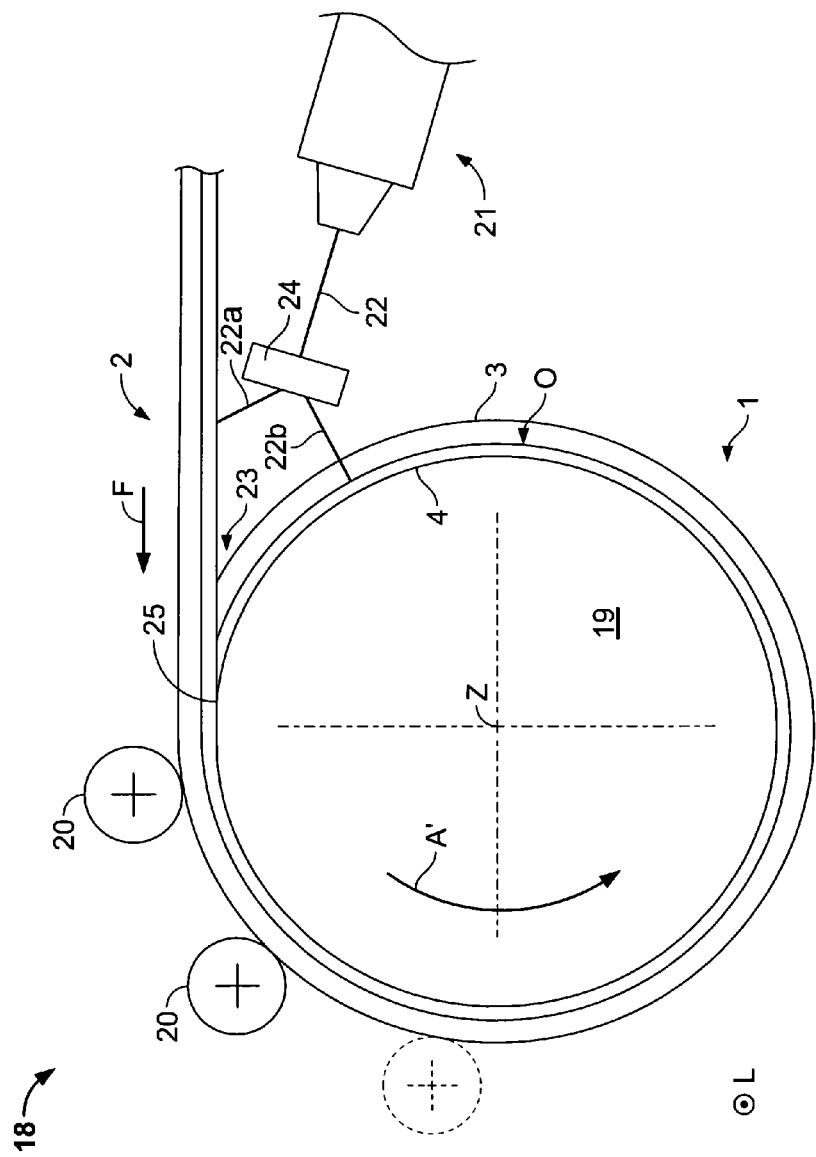
Figure 8:
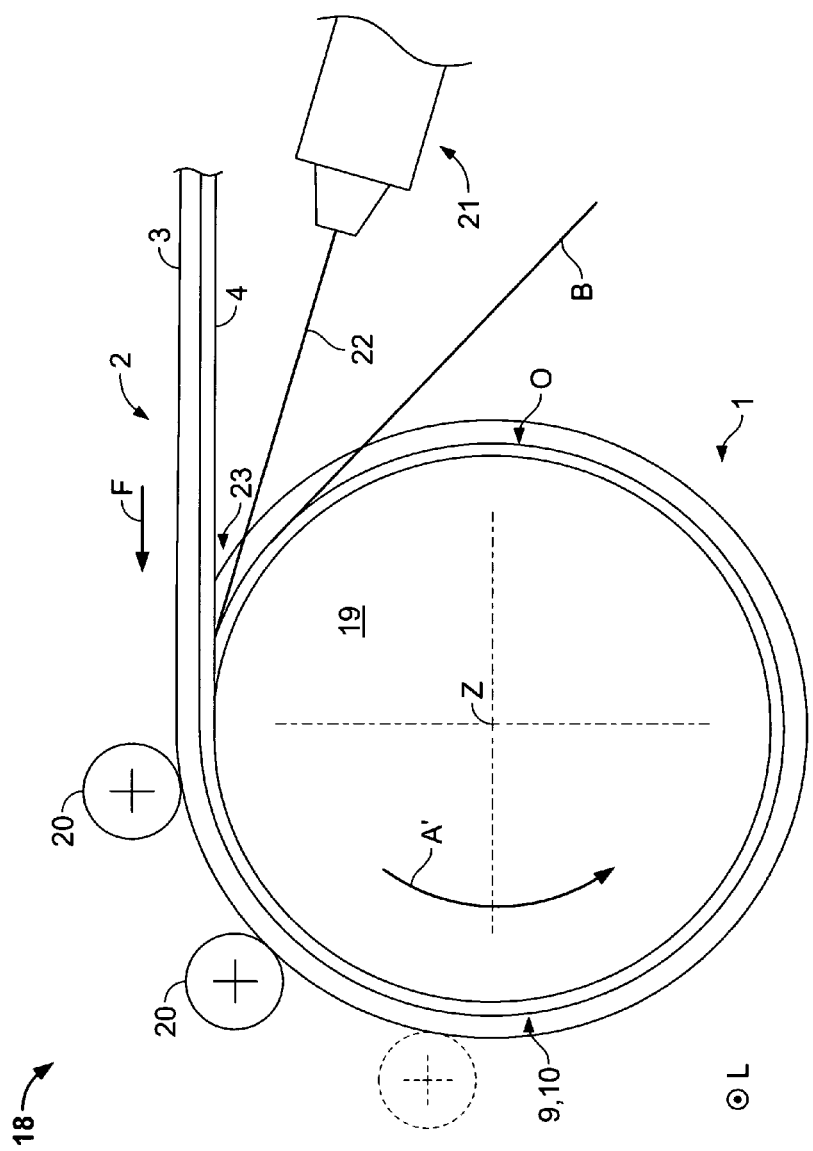
Figure 9:
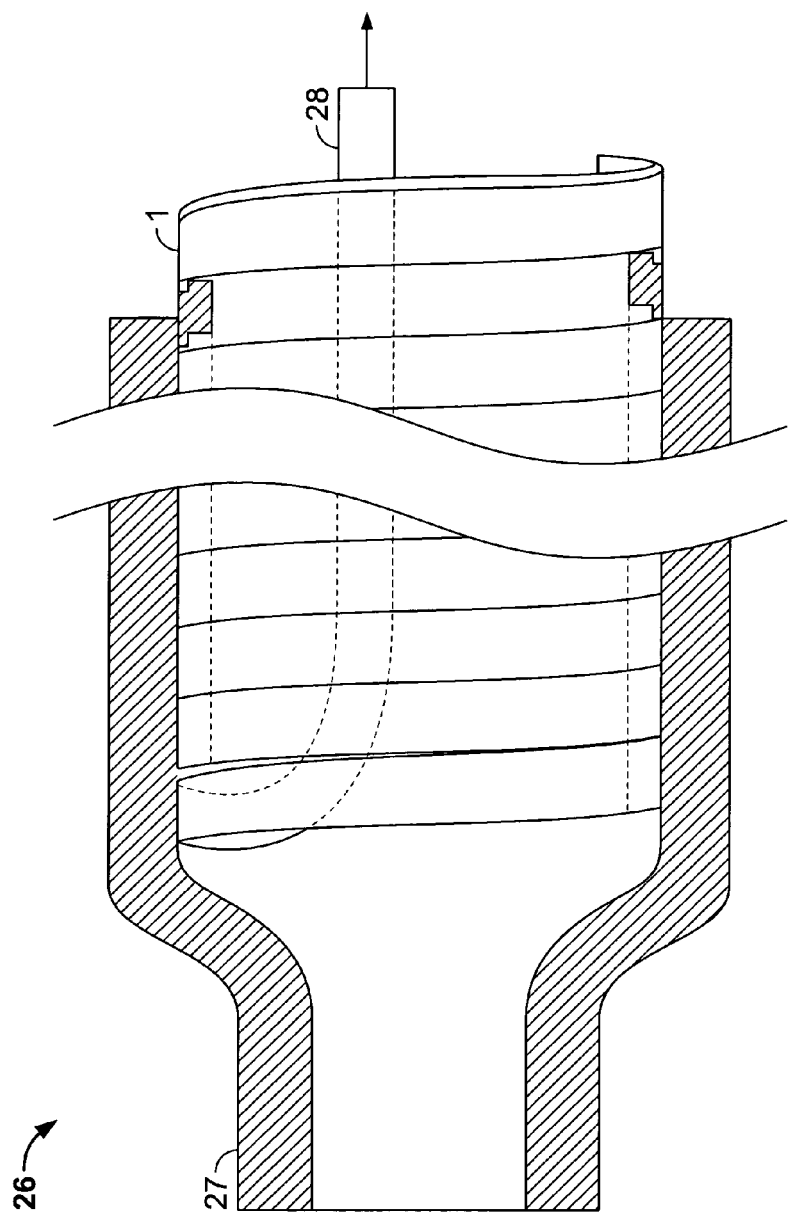

FIG. 5a-c are schematic views of exemplary embodiments of a laser connection seam;

FIG. 6 is a schematic view of the device according to the invention for the production of the helical support according to the invention;

FIG. 7 shows a further embodiment of the device according to the invention;

FIG. 8 shows a further embodiment of the device according to the invention comprising an absorption band;

FIG. 9 is a schematic sectional view of a tubing arrangement according to the invention comprising the helical support from FIG. 1.

First, the construction and function of the helical support according to the invention will be described with reference to the embodiment of FIG. 1.

FIG. 1 shows a helical support 1 extending in a longitudinal direction L and formed by an extruded element 2 wound in a winding direction A exiting or entering the drawing plane. The extruded element 2 is wound about by a central axis Z, extending parallel to the longitudinal direction L, of the helical support 1, with a constant radius at a distance from the helical support 1, individual windings being wound so as basically to lie on top of one another. Alternatively, the radius of the helical support may also be varied during winding, resulting in helical supports with different diameters along the longitudinal direction thereof.

Two windings consisting of the wound extruded element 2 are shown in cross-section in the upper region P of the helical support 1. Connection portions of the two adjacent windings, which portions lie alongside one another, are stepped and have complementary shapes, overlap in a radial direction r of the helical support 1 in an overlap region O. The overlap region O has a constant width B facing in the longitudinal direction L along the windings.

At the left-hand end of the helical support 1 in FIG. 1, the extruded element 2 is released from the penultimate winding and is guided through the internal hollow region of the helical support 1 to the right-hand end thereof, from which it projects in part.

Figure 2:
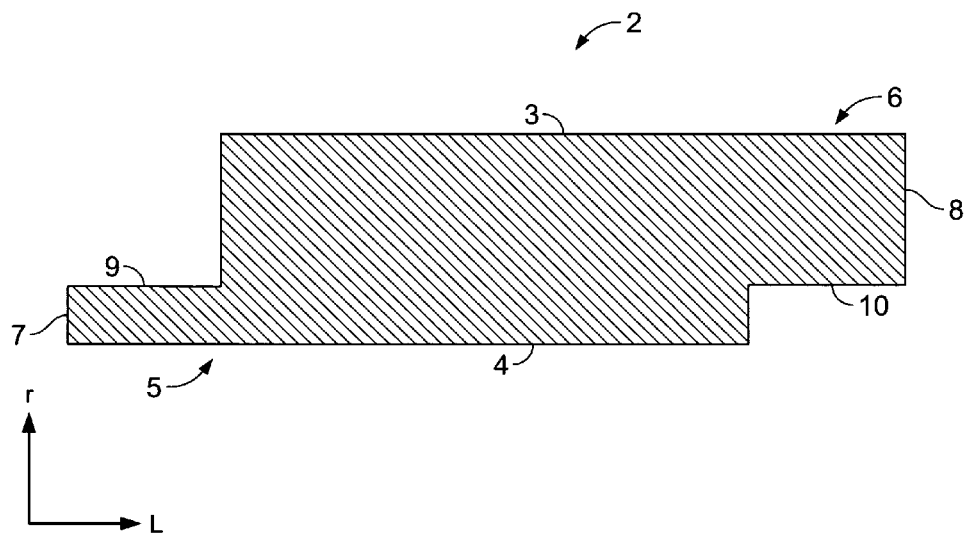
FIG. 2 is a schematic view of a cross-section of an extruded element used to produce the helical support.

FIG. 2 is a sectional view of the extruded element 2 from FIG. 1. Like reference numerals are used for elements which have the same function and construction as the elements in the embodiment of FIG. 1. For brevity's sake, only the differences from the embodiment of FIG. 1 are discussed.

The extruded element 2 has a substantially rectangular cross-section with upper and lower surfaces 3, 4 extending parallel to the longitudinal direction L. The regions 5, 6 of the extruded element 2 facing in and against the longitudinal direction L are provided with recesses which comprise rectangular, diagonal corner regions and which are adjacent to the remaining connection portions 7, 8. The connection portions 7, 8 in this case have a smaller expansion in the radial direction r than the remaining central region of the extruded element 2. In particular, the connection portions 7, 8 are formed with complementary stepped shapes and in this case comprise connection surfaces 9, 10 extending parallel to the longitudinal direction L and facing the adjacent recess. In the embodiment of FIG. 2, the extruded element 2 consists entirely of a material which is not transparent to the laser beam.

However, it is also possible for only the connection portions 7, 8 or the regions 6, 7 of the extruded elements 2 to consist of a material which is not transparent to laser beams, at least within a specific wavelength range.

If the extruded element 2 consists of a material which is transparent to laser beams or reflects laser beams, at least one of the connection portions 7, 8 may also be provided with a material which is not transparent to laser beams and reflects laser beams only to a low degree, and may for example be coated with this material. This material may also be adsorbed by the connection surfaces or absorbed by the connection portions. Alternatively, a component which is not transparent to laser beams and is for example leaf-shaped may be arranged between two connection portions 7, 8 which are to be connected. This component can convert the energy of the laser beam into heat which is subsequently released into the connection portions 7, 8.

The connection portions 7, 8 may also be of a different shape. In particular, the connection portions 7, 8 may also for example comprise hook-shaped shaping elements or, as is explained below in relation to FIG. 4, be formed with guide portions which engage in one another and are for example configured as defined contact surfaces of the connection portions 7, 8. The connection surfaces 9, 10 may also be curved or extended so as to be tilted in relation to the longitudinal direction and comprise raised contact surfaces.

FIG. 3 shows the extruded element 2 of FIG. 2 with additional adjacent windings. Like reference numerals are used for elements which have the same function and construction as the elements in the embodiments of the previous figures. For brevity's sake, only the differences from the embodiments of the figures already described are discussed.

The extruded element 2 of FIG. 2 is in this case shown as a winding 11 which is enclosed in the longitudinal direction L by two further windings 12, 13, which also consist of the extruded element 2. The connection surfaces 9, 10 overlap in the overlap region O. The connection portions are in this case formed so as to be of different sizes in the longitudinal direction L so that when the extruded element is wound tightly, a winding gap 14 remains between the windings 11, 12, 13 and may face towards or away from the axis Z. The connection surfaces 9, 10 of the windings 11, 12, 13 are in this case connected to one another via a laser connection seam 15 formed between the connection surfaces 9, 10. The laser connection seam 15 extends mainly parallel to the surfaces 3, 4 of the extruded element 2.

In this case, too, the connection portions 7, 8 may be shaped differently, for example curved. In particular, the connection surfaces 9, 10 may also extend diagonally relative to the longitudinal direction L, the connection surfaces 9, 10 comprising components facing in the longitudinal direction L so as to overlap in the radial direction r.

FIG. 4 shows a further embodiment of the windings 11, 12, 13, like reference numerals being used for elements which have the same function and construction as the elements in the embodiments of the previous figures. For brevity's sake, only the differences from the embodiments of the figures already described are discussed.

In this case, too, the helical support 1 with the extruded element 2 is shown in a sectional view with schematically illustrated windings 11, 12, 13 and with connection surfaces 9, 10 connected via the laser connection seam 15. The connection portions 7, 8 comprise guide portions 16, 17 on the ends thereof facing in and against the longitudinal direction L. The guide portions 16, 17 keep the distance between two adjacent windings 11, 12, 13 as constant as possible during the winding process. For this purpose, the guide portions 16, 17 are configured in such a way as to engage behind one another in the longitudinal direction L. The guide portions 16, 17, in this case shown as pillars with a rectangular outline extending parallel to the radial direction, may also be configured differently, in particular in a hook shape. The guide portions 16, 17 may also be pin-shaped, rounded off in the radial direction r or formed with chamfered edges. In this case, too, the winding gap 14 remains between the windings 11, 12, 13.

FIG. 5a-c show further embodiments, like reference numerals being used for elements which have the same function and construction as the elements in the embodiments of the previous figures. For brevity's sake, only the differences from the embodiments of the figures already described are discussed.

In this case, two adjacent windings 11, 12 are shown in a plan. The radial direction r comes out of the drawing plane. The connection surfaces 9, 10 of the adjacent windings 11, 12 overlap in the overlap region O which extends along the winding direction A. The laser connection seam 15 is shaped in approximately the middle of the overlap region O and extends in a straight line along the winding direction A in FIG. 5a. The laser connection seam 15 may also be arranged eccentrically within the overlap region O.

The overlap region O also extends substantially parallel to the winding direction A in FIG. 5b. In the overlap region O, the laser connection seam 15 does not extend in a straight line but changes direction repeatedly or even extends in a waveshape along the winding direction A. Although this is not shown here, the width of the laser connection seam 15 can also be varied.

In contrast to FIGS. 5a and 5b, the laser connection seam 15 in FIG. 5c is shown with breaks rather than as a continuous seam. The individual connected regions of the laser connection seam 15 may be oval, round or polygonal, and in particular triangular as shown here, and may be aligned in any manner. It may in this case be advantageous if a vertex for example of the triangle shown here faces in or against the winding direction A, the connected regions repeatedly change their alignment or the regions are all aligned in the same direction.

FIG. 6 shows a first embodiment of a device according to the invention for the production of a helical support 1, like reference numerals again being used for elements which have the same function and construction as the elements in the embodiments of the previous figures. For brevity's sake, only the differences from the embodiments of the figures already described are discussed.

The device 18 as shown in FIG. 6 for the production of the helical support 1 comprises a winding means 19 configured as a winding mandrel, to which the extruded element 2 being fed in the feed direction F is fastened and has already been wound to form at least one winding. The production device 18 comprises a plurality of pressure rollers 20 and at least one laser beam source 21 as well as the winding means 19.

To produce the helical support 1, the extruded element 2 is initially fastened to the substantially cylindrical winding mandrel 19, for example with a clamping means. The extruded element 2 may for example be produced in an extrusion process and subsequently be fed, in the freshly extruded state, to the production device 18 in a feed direction F. The winding mandrel 19 subsequently winds the extruded element 2 in such a way that the individual windings 11, 12, 13 lie tightly against one another and radially overlap in part, as shown in FIG. 1.

For the winding process, the winding mandrel 19 rotates about the longitudinal axis S thereof in a direction of rotation A'. The helical support 1 in this case lies at least in portions on the outer peripheral surface of the winding mandrel 19. A plurality of pressure rollers 20 press the extruded element 2 against the outer peripheral surface of the winding mandrel 19 in such a way that the helical support 1 ends up with a constant diameter.

The pressure produced by the pressure rollers 20 in this case may for example also be created by a runner, which together with the winding mandrel 19 forms a feed gap which narrows in the feed direction. The contact pressure may also be produced without using pressure elements, such as the pressure rollers 20, if a force acting against the feed direction F acts on the extruded element 2 to be wound, this force nevertheless enabling the extruded element 2 to be wound so as to form the helical support 1.

At least the winding means 19 and the feed means move relative to one another or in particular away from one another parallel to the longitudinal direction L at a predetermined speed.

The two overlapping connection surfaces 9, 10 of the extruded element 2 are irradiated by a laser beam 22 which is emitted by the laser beam source which in this case is arranged statically, heated to the connection temperature and subsequently connected to one another and in particular welded together. For example, to produce a plurality of laser connection seams 15 in the helical support 1 simultaneously, the production device 18 may also comprise a plurality of laser beam sources 21 or the laser beam source 21 may direct a plurality of laser beams 22 onto the connection surfaces 9, 10. It is also possible for at least one of the connection surfaces 9, 10 to be heated to a predetermined preheating temperature, which may be lower than the connection temperature, by at least one laser beam 22, before a further laser beam 22 heats the connection surfaces 9, 10 to the connection temperature.

The laser beam 22 is directed into a winding gap 23 which widens in the direction opposite the feed direction F between a portion which has not yet been wound of the extruded element 2 and one of the adjacent windings 11, 12, 13. The laser beam 22 thus meets the overlapping connection surfaces 9, 10 and heats them to a sufficient degree for them to form a material connection and where possible be welded, as soon as they are brought into contact by the production device 18.

If it should be necessary, for example for reasons of space, the laser beam source 21 may also be positioned elsewhere and the laser beam 22 may in particular also be directed into the winding gap 23 by various deflection devices, such as mirrors or prisms. The position of at least one deflection means may be variable in a targeted manner, to produce for example the wave-shaped configuration of the laser connection seam 15. A laser beam interrupter may also be provided in the beam path of the laser beam 22 and does not allow the laser beam to pass in the direction of the winding gap 23 at predetermined points in time. Likewise, further optical elements which deflect and in particular focus the laser beam 22 may additionally be positioned in the beam path.

FIG. 7 shows a further embodiment, like reference numerals again being used for elements which have the same function and construction as the elements in the embodiments of the previous figures. For brevity's sake, only the differences from the embodiments of the figures already described are discussed.

FIG. 7 again shows the production device 18. In this case, another beam splitter 24 is inserted into the beam path of the laser beam 22 between the laser beam source 21 and the winding gap 23. The beam splitter 24 divides the laser beam 22 directed into the winding gap 23 into two laser beams 22a, 22b. The laser beams 22a, 22b meet the connection surfaces 9, 10 at a distance from an initial contact point 25 at which the fed extruded element 2 meets the adjacent winding 11, 12, 13. In this case, too, the laser beam 22 may be fed to the beam splitter 24 via deflection means or the split laser beams 22a, b may be directed onto the connection surfaces 9, 10 via deflection elements. Instead of deflection means, the position of the beam splitter 24 may also be variable so that the shape of the resulting laser connection seam 15 can thus be varied.

A shaping unit, which shapes the extruded element 2 and is in particular configured as an extrusion device, and additionally or alternatively a reserve means for extruded elements 2, may be part of the production device 18.

FIG. 8 shows a further embodiment of the device according to the invention for the production of a helical support 1, like reference numerals again being used for elements which have the same function and construction as the elements in the embodiments of the previous figures. For brevity's sake, only the differences from the embodiments of the figures already described are discussed.

The process shown here for the production of the tubular helical support 1 exhibits the production device 18 of FIG. 6. In addition to the production device 18 of FIG. 6, an absorption band B in the form of a strip-shaped or leaf-shaped component is in this case fed to the winding gap 23 by an absorption band feed unit (not shown). The absorption band feed unit may comprise an absorption band store or an extrusion unit for absorption bands as well as feed elements such as deflection rollers.

When the extruded element 2 is being wound to form the helical support 1, the absorption band B is arranged between the connection portions 7, 8, which lie alongside one another and overlap one another radially, or between the connection surfaces 9, 10 to be connected. As is shown, the absorption band B may be applied to one of the connection surfaces 9, 10 of the most recently wound portion of the extruded element 2 shortly before the connection surfaces 9, 10 meet one another and be wound with the extruded element 2 to form the helical support 1 and connect the connection portions 7, 8 to one another as a component of the laser connection seam 15.

Alternatively, the absorption band B may be applied to or adhere to at least one of the connection surfaces 9, 10 at a greater distance from the winding gap 23 in the winding direction A, for example immediately after extrusion. The absorption band B may also be positively or non-positively connected to the connection surface 9, 10 or to one of the connection portions.

FIG. 9 shows a first embodiment of a tubing arrangement 26 comprising tubing which is resiliently expanded radially outwards and in which a helical support 1 is arranged so as to support the tubing arrangement. Like reference numerals are again used for elements which have the same function and construction as the elements in the embodiments of the previous figures. For brevity's sake, only the differences from the embodiments of the figures already described are discussed.

FIG. 9 shows an embodiment of a tubing arrangement 26 according to the invention, in which a resiliently expanded tubing 27, for example insulation tubing or a sleeve element, which may also consist at least in part of electrically conductive materials such as elastomers, is in part held in an expanded state by the helical support 1 according to the invention. The insulation tubing 27 is made of a resilient, electrically insulating material, for example silicone, and is used for the electrical insulation of electrical components. For insulation, the insulation tubing 27 should enclose the components to be insulated, similarly to a shrink-tube. So that the insulation tubing 27 can easily be positioned around the components to be insulated, it is held in the expanded state by the helical support 1. If the component to be insulated is surrounded by the insulation tubing arrangement 26, then the helical support 1 can be released by pulling on a free end 28, projecting through the extruded element 2, of the helical support 1. As soon as the helical support 1 is released, the expanded insulation tubing 26 compresses and encloses the component (not shown).

The invention claimed is:

1. A tubular helical support for the radial support of resiliently expanded tubing, made of at least one extruded element, which is wound to form a plurality of windings having an internal hollow region, a first portion of the extruded element being connected to the plurality of windings at a first end of the plurality of windings and extending through the internal hollow region of the plurality of windings along a longitudinal direction of the plurality of windings to a location proximate a second end of the plurality of windings, the extruded element is provided on both sides with connection portions with complementary contours, the adjacent connection portions of two adjacent windings overlapping radially at least in portions and comprising connection surfaces that are connected by a connection seam, that are not transparent to laser beams, and that the connection surfaces of the adjacent windings overlap in the overlap region which extends along a winding direction which is perpendicular to the longitudinal direction, the connection seam being a laser connection seam that mainly extends in the overlap region, the entire laser connection seam of the two adjacent windings of the plurality of windings is located between an exterior of the two adjacent windings of the plurality of windings and the internal hollow region of the two adjacent windings of the plurality of windings and is not accessible from the exterior of the two adjacent windings of the plurality of windings.

2. The tubular helical support according to claim 1, wherein the extruded element is made of a material which is not transparent to laser beams.

3. The tubular helical support according to claim 1, wherein the extruded element is only made of one material.

4. The tubular helical support according to claim 1, wherein the connection seam comprises an absorption band or a coating which absorbs laser beams.

5. A tubular helical support extending in a longitudinal direction for the radial support of resiliently expanded tubing, made of at least one extruded element, having a substantially rectangular cross-section with upper and lower surfaces extending parallel to the longitudinal direction, the extruded element being wound to form a plurality of windings and provided on both sides with connection portions with complementary contours, the adjacent connection portions of two adjacent windings overlapping radially at least in portions and comprising connection surfaces that are connected by a connection seam, wherein the connection surfaces are not transparent to laser beams and the seam is a laser connection seam that extends mainly parallel to the surfaces of the extruded element.

6. A process for the production of a tubular helical support, in which an extruded element of a winding means is fed in a feed direction and wound to form the tubular helical support, connection surfaces, formed on both sides of the extruded element, of a wound portion and a portion not yet wound of the extruded element being made to overlap at least in part in a radial direction of the helical support and being connected to one another by means of at least one laser beam, the laser beam being directed into a winding gap, which expands in the direction opposite the feed direction, between the wound portions and the portions not yet wound of the extruded element, and onto at least one of the connection surfaces lying alongside one another, the laser beam forming a laser connection seam an entirety of which is located within the tubular helical support between an exterior of the tubular helical support and an internal hollow region of the tubular helical support, and extending a first portion of the extruded element being connected to the tubular helical support at a first end of the tubular helical support through the internal hollow region of the tubular helical support along a longitudinal direction of the tubular helical support to a location proximate a second end of the tubular helical support.

7. The process according to claim 6, wherein the laser beam is incident on at least one of the connection surfaces before they are brought into contact.

8. The process according to claim 6, wherein an absorption band is fed to the winding gap and the laser beam is directed into the winding gap and onto the absorption band.

9. The process according to claim 6, wherein a plurality of laser beams containing the laser beam energy are directed onto one of the two opposite connection surfaces.

10. The process according to claim 6, wherein the laser beams are split from one laser beam.

11. A device for the production of a helical support having an internal hollow region extending along a longitudinal direction of the helical support, comprising at least one winding means which supports the helical support at least in portions, at least one extruded element which can be fed to the winding means in a feed direction and fastened thereto, the feed direction being perpendicular to the longitudinal direction of the helical support, a winding gap which widens in a direction opposite the feed direction between a portion of the extruded element wound on the winding means and a portion not yet wound of the extruded element, and comprising at least one laser beam source emitting at least one laser beam, wherein the at least one laser beam is directed into the winding gap and onto at least one of the radially overlapping connection surfaces of the extruded element to form a laser connection seam an entirety of which is located within the helical support between an exterior of the helical support and the internal hollow region of the helical support.

12. The device according to claim 11, wherein at least one beam splitter is arranged in the beam path of the laser beam between the laser beam source or a deflection means and the winding gap.

13. The device according to claim 11, wherein the device comprises an absorption band feed unit which feeds the absorption band to the winding gap.

14. A tubing arrangement comprising a tubing which is resiliently expanded radially outwards and in which a helical support is arranged so as to support the tubing arrangement, wherein the helical support is made of at least one extruded element, which is wound to form a plurality of windings having an internal hollow region, a first portion of the extruded element being connected to the plurality of windings at a first end of the plurality of windings and extending through the internal hollow region of the plurality of windings along a longitudinal direction of the plurality of windings to a location proximate a second end of the plurality of windings, the extruded element is provided on both sides with connection portions with complementary contours, the adjacent connection portions of two adjacent windings overlapping radially at least in portions and comprising connection surfaces that are connected by a connection seam, that are not transparent to laser beams, and that the connection surfaces of the adjacent windings overlap in the overlap region which extends along a winding direction which is perpendicular to the longitudinal direction, the connection seam being a laser connection seam that mainly extends in the overlap region, the entire laser connection seam of the two adjacent windings of the plurality of windings is located between an exterior of the two adjacent windings of the plurality of windings and the internal hollow region of the two adjacent windings of the plurality of windings and is not accessible from the exterior of the two adjacent windings of the plurality of windings.

15. A tubing arrangement comprising a tubing which is resiliently expanded radially outwards and in which a helical support is arranged so as to support the tubing arrangement, wherein the helical support is formed by a process in which an extruded element of a winding means is fed in a feed direction and wound to form the helical support having an internal hollow region extending along a longitudinal direction of the helical support, the longitudinal direction being perpendicular to the feed direction, connection surfaces, formed on both sides of the extruded element, of a wound portion and a portion not yet wound of the extruded element being made to overlap at least in part in a radial direction of the helical support and being connected to one another by means of at least one laser beam, the laser beam being directed into a winding gap, which expands in the direction opposite the feed direction, between the wound portions and the portions not yet wound of the extruded element, and onto at least one of the connection surfaces lying alongside one another to form a laser connection seam an entirety of which is located within the helical support between an exterior of the helical support and the internal hollow region of the helical support.

\* \* \* \* \*